July 25, 1933.    L. R. ANDERSON ET AL    1,919,921
CONTINUOUS INDICATING VISCOSITY GAUGE
Filed April 13, 1927    2 Sheets-Sheet 1
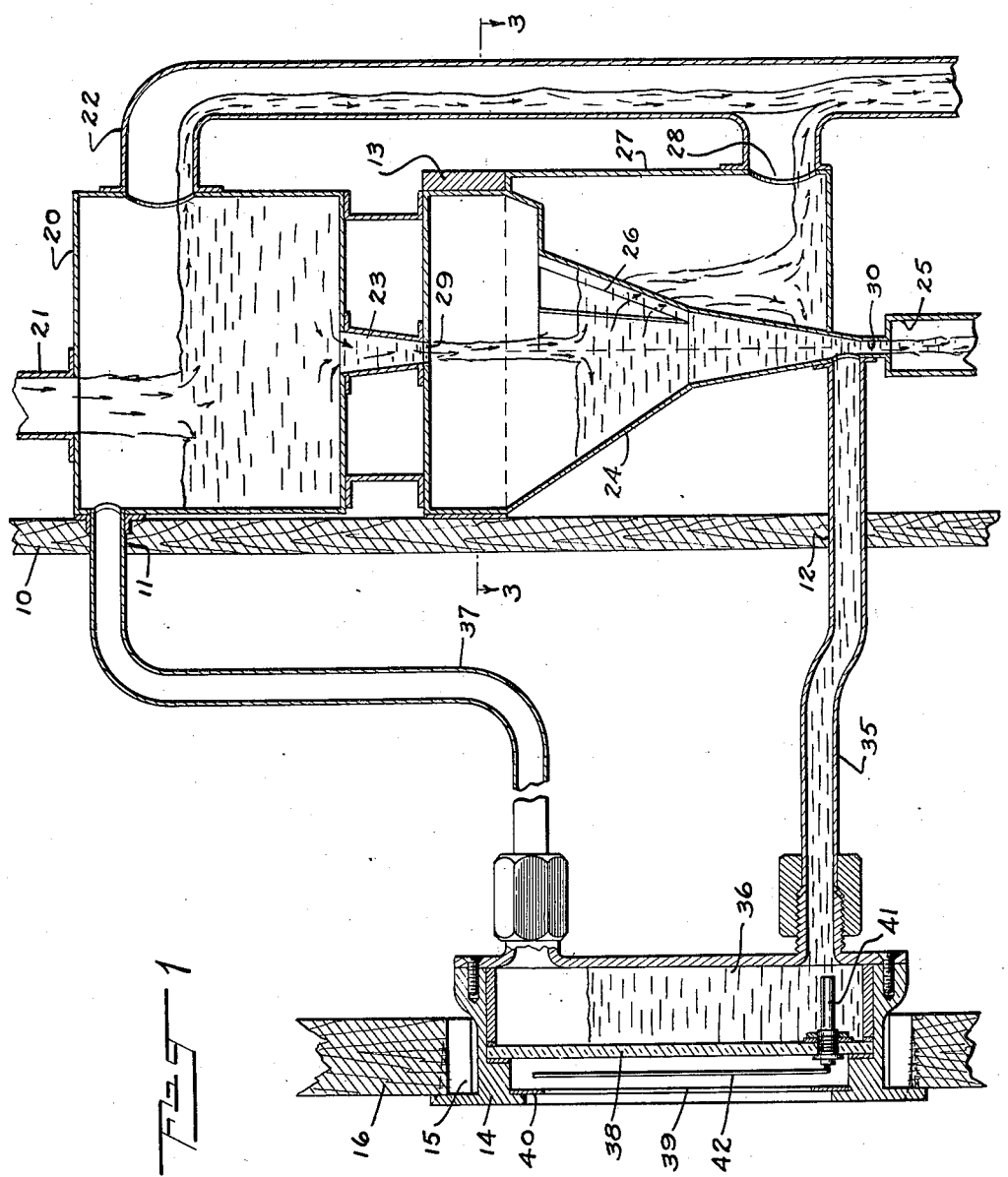
INVENTOR.
Loris R. Anderson.
Henry E. Pengilly.
BY
ATTORNEY.

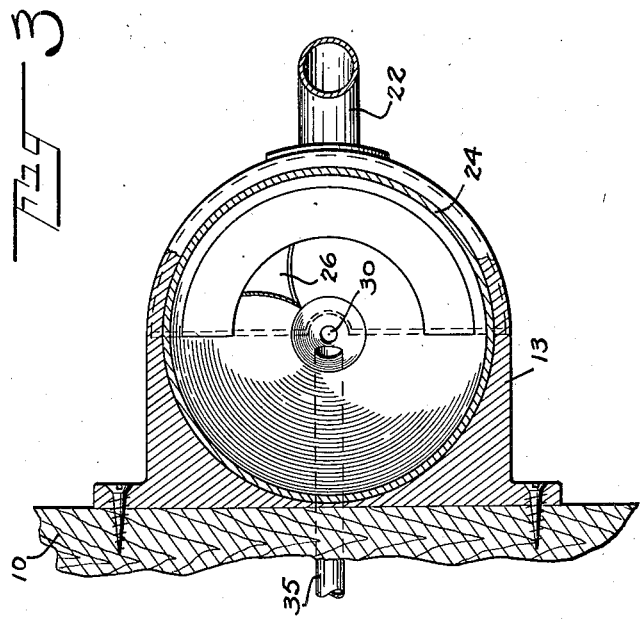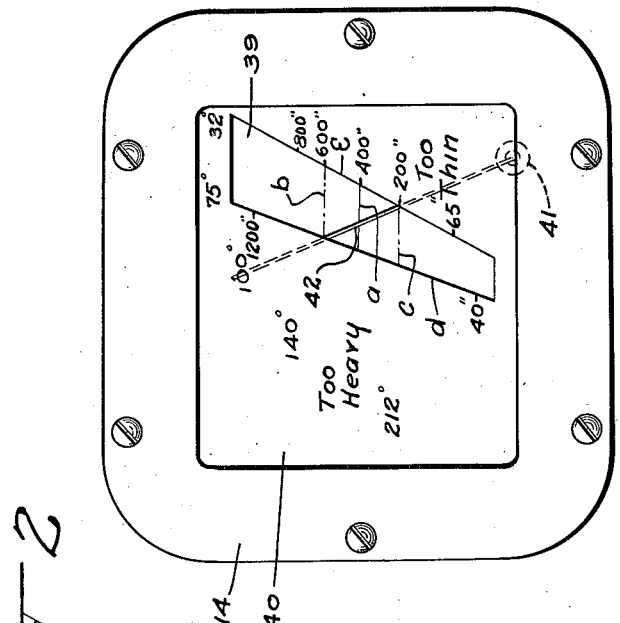

Patented July 25, 1933

1,919,921

UNITED STATES PATENT OFFICE

LORIS R. ANDERSON, OF BROOKLYN, AND HENRY E. PENGILLY, OF HOLLIS, NEW YORK

CONTINUOUS INDICATING VISCOSITY GAUGE

Application filed April 13, 1927. Serial No. 183,284.

The invention relates to measuring apparatus as an indicating device for determining the viscosity of a liquid, more particularly lubricatig oil employed, for example, in a prime mover such as an internal combustion engine driving a self-propelled vehicle.

It has for its object to provide a device of this character which will afford a continuous and visual indication of the viscosity of the lubricant passing therethrough, as well as in its relation to temperature conditions prevailing, for example, in the prime mover which is lubricated thereby.

To this end, the invention consists in providing a container through which the lubricant or other liquid under constant head is continually drawn and in such a manner that its level therein will depend on the degree of viscosity of said liquid, the arrangement, furthermore, contemplating a visual indication of the prevailing level condition. There is associated, also, with the portion affording the visual indication a temperature responsive element which cooperates therewith to enable the correct viscosity condition at a particular temperature to be ascertained, as by reference to a graduated dial member or the like over which a pointer controlled by the said temperature responsive element is movable and through which dial a portion of the viscosity condition is visible.

The nature of the invention, however, will best be understood when described in connection with the accompanying drawings, in which:

Fig. 1 is a longitudinal section through the novel gauge member.

Fig. 2 is a front elevation of the instrument portion.

Fig. 3 is a fragmentary transverse section taken on the line 3—3, Fig. 1 of the drawings, and looking in the direction of the arrows.

Referring to the drawings, the novel viscosimeter is shown, by way of example, as applied to the indication of the degree of viscosity of lubricant utilized in an internal combustion engine of a self-propelled vehicle, 10 designating the dashboard of said vehicle with which the measuring apparatus may conveniently be associated and in which dashboard openings 11 and 12 may be drilled to admit of bringing therethrough flexible pipe connections hereinafter set forth. The one portion of the apparatus is shown, also, as attached to said board as by screwing a supporting block 13 for said portion thereto. The other and visible portion of the measuring apparatus is arranged to be mounted in a suitable flanged casing 14 designed to fit within an opening 15 of the usual instrument board 16 provided in the interior of the vehicle, as by screwing the flange of said casing to the said instrument board.

The measuring apparatus embodies a source of supply of lubricant at constant head, as constant-level casing 20 which is designed to be connected to the oil lead pipe 21 from the oil filter (not shown) of the lubricating system of the internal combustion engine. An outlet conduit 22 of ample proportions for the particular lubricating system employed connects with the upper portion of said casing 20 to maintain therein always a substantially constant head of lubricant; while the bottom of said casing is provided with an outlet 23 adapted to deliver the lubricant under this constant head into the measuring casing 24 and from the lower portion of which it is returned through pipe 25, for example, to the crankcase (not shown) of the internal combustion engine.

Casing 24 may be conically formed at its lowermost portion as well as at the upper portion, but the latter is of a lesser angle and affords thereby a correspondingly greater cross-sectional area for a given vertical interval. The said upper portion is further provided with a V-shaped opening 26 through which excess lubricant is delivered into a spill-over or by-pass casing 27 formed about the one-half portion of said measuring casing and having an outlet 28 at its lower end communicating with the conduit 22, this conduit returning the lubricant not utilized in the measuring operation also to the crank-case (not shown).

In accordance with the invention, the inlet opening 29 at the top of the measuring casing 24 is to be of greater cross-sectional area than the outlet opening 30 located at the bottom of said casing, so that an accumulation of lubricant will develop in the measuring casing, the height or level of which depends upon the degree of its viscosity. That is to say, since lubricant will flow into the measuring casing 24 through opening 29 faster than it can be removed through opening 30, it may completely fill the lower half and rise in the upper half to a degree depending upon whether it is of a light or heavy nature, a certain proportion being removable through the varying by-pass opening 26 to hold a definite level for a particular degree of viscosity.

In order that this level of lubricant may be conveniently viewed at a distance, as at the instrument board 16, provision is made for transferring the level to the instrument or gauge casing 14 through a tubular extension 35 communicating with the interior of a casing 36 to form a level indicating extension of the said measuring casing 24. A vent connection 37 is also taken from the top of said casing 36 to the upper portion of the constant-level casing 20; and the front face of the casing or chamber 36 is constructed of transparent material comprising, for example, a sheet of glass 38. Through this face the lubricant level in said chamber may be viewed as well as through a window 39 provided in the dial 40 of the instrument.

It is desirable, also, that the particular temperature of the lubricant, whose viscosity is being determined, be also known since the viscosity is a function of the temperature of said lubricant. To this end, a temperature responsive element 41 is inserted into the chamber 36 and lubricant contained therein so that the said element is exposed directly to the lubricant temperature. A measuring pointer 42 controlled by said temperature responsive element 41 is mounted for movement in front of the glass face 38 of chamber 36 oscillating before the window 39 and cooperating thereby with the liquid level displayed through said window and the transparent plate 38. The window 39 is preferably made in the shape of an inclined quadrangle with diverging sides tapering outwardly from bottom to top to conform to calibration requirements as well as to attain the maximum coaction between the measuring pointer 42 and the variable liquid level displayed through the window. The different levels, vertically, of the liquid are graduated on the dial at the sides of the opening according to the usual Saybolt viscosity scale, while the temperature calibrations are also noted thereon in the usual manner.

Thus, by means of the sight glass or chamber 36 affording a variable level of the lubricant in accordance with its viscosity and the coacting pointer member moving relatively thereto in accordance with the thermal condition of said lubricant, a ready means is afforded for directly determining whether or not a lubricant of the proper characteristic is being utilized, as, for example, in the specific embodiment of an internal combustion engine as indicated. For example, in the position set forth in Fig. 2 of the drawings, the lubricant temperature is noted as 100°, while the actual level thereof—indicated by the full line "$a$"—stands at approximately 400" according to the viscosity scale. This would be a proper condition for satisfactory operation of the lubricant under the conditions noted; but if the lubricant should rise to a position equal to or beyond that indicated by the broken line "$b$", it would be too heavy a lubricant for use at the temperature noted. On the other hand, if the level stood at or below the position indicated by the broken line "$c$", the lubricant would be too thin for best results. Therefore, the particular points at which the pointer 42 intersects the lines or sides "$d$" and "$e$", respectively of the window 39, will determine the limits of lubricant levels for satisfactory operation of the latter under the particular temperature conditions prevailing and as indicated by the position of said pointer.

We claim:

1. A viscosity indicating gauge, comprising a measuring casing having an upper inlet for lubricant whose viscosity it is desired to determine, there being an opening at the upper portion thereof and an outlet substantially at the bottom of said casing and of lesser cross-sectional area than said inlet, whereby an accumulation of the lubricant in the casing will develop in accordance with the viscosity of the lubricant, a discharge conduit in communication with said upper opening to by-pass lubricant around said outlet opening of the casing, and a constant-level casing for the lubricant located above the measuring casing and having an outlet adapted to discharge a stream of lubricant to the measuring casing and provided also with an inlet of greater cross-sectional area than said outlet and with an overflow outlet communicating with the said discharge conduit.

2. A viscosity indicating gauge, comprising a measuring casing having an upper inlet for lubricant whose viscosity it is desired to determine, there being an opening at the upper portion thereof and an outlet substantially at the bottom of said casing and of lesser cross-sectional area than said inlet, whereby an accumulation of the lubricant in the casing will develop in accordance with the viscosity of the lubricant, a discharge conduit in communication with said upper opening to by-pass lubricant around said outlet opening of the casing, the upper opening being of increasing area of opening in a direction for decreasing the rate of accumulation of lubricant in the casing, and a constant-level casing for the lubricant located above the measuring casing and having an outlet adapted to discharge a stream of lubricant to the measuring casing and provided also with an inlet of greater cross-sectional area than said outlet and with an overflow outlet communicating with the said discharge conduit.

3. A viscosity indicating gauge, comprising a measuring casing having an inlet for lubricant whose viscosity it is desired to determine, there being an opening at the upper portion thereof and an outlet substantially at the bottom of said casing of lesser cross-sectional area than said inlet, whereby an accumulation of the lubricant in the casing will develop in accordance with the viscosity of the lubricant, said casing having an extension affording a level indicating chamber and provided with a transparent portion to permit the level of the lubricant therein to be viewed, and temperature responsive means actuated by the temperature of the lubricant including an indicating member movable over the transparent portion of the extension.

4. A viscosity indicating gauge, comprising a measuring casing having an inlet for lubricant whose viscosity it is desired to determine, there being an opening at the upper portion thereof and an outlet substantially at the bottom of said casing of lesser cross-sectional area than said inlet, whereby an accumulation of the lubricant in the casing will develop in acordance with the viscosity of the lubricant, said casing having an extension affording a level indicating chamber and provided with a transparent portion to permit the level of the lubricant therein to be viewed, temperature responsive means actuated by the temperature of the lubricant including an indicating member movable over the transparent portion of the extension, an indicating dial graduated for temperature and for viscosity, said dial being provided with an opening behind which is located the transparent portion of the extension, the indicating member of the temperature responsive device being movable before the opening of the dial to cooperate with the free surface of the variable liquid column therein.

5. A viscosity indicating gauge, comprising a measuring casing having an inlet for lubricant whose viscosity it is desired to determine, there being an opening at the upper portion thereof and an outlet substantially at the bottom of said casing of lesser cross-sectional area than said inlet, whereby an accumulation of the lubricant in the casing will develop in accordance with the viscosity of the lubricant, said casing having an extension affording a level indicating chamber and provided with a transparent portion to permit the level of the lubricant therein to be viewed, temperature responsive means actuated by the temperature of the lubricant and cooperating with the said extension, an indicating dial graduated for temperature and for viscosity indication, said dial being provided with an inclined opening having diverging sides opening upwardly and behind which is located the transparent portion for the extension, and a pointer member for the temperature responsive device, said pointer member being movable before the opening of the dial and adapted to cross the level of the variable liquid column therein.

6. A viscosity indicating gauge, comprising a measuring casing having an inlet for lubricant whose viscosity it is desired to determine, there being an opening at the upper portion thereof and an outlet substantially at the bottom of said casing of lesser cross-sectional area than said inlet, whereby an accumulation of lubricant in the casing will develop in accordance with the viscosity of the lubricant, a constant-level casing for the lubricant located above the measuring casing and adapted to be connected thereto and to a source of lubricant supply, an overflow conduit from said constant-level casing, and a casing in communication with said upper opening to by-pass the outlet opening of the measuring casing and connected with the said overflow conduit from the constant-level casing.

7. A viscosity indicating gauge, comprising a measuring casing having an inlet for lubricant whose viscosity it is desired to determine, there being an opening at the upper portion thereof and an outlet substantially at the bottom of said casing of lesser cross-sectional area than said inlet, whereby an accumulation of lubricant in the casing will develop in accordance with the viscosity of the lubricant, a constant-level casing for the lubricant located above the measuring casing and adapted to be connected thereto and to a source of lubricant supply, the said measuring casing having an extension affording a level indicating chamber and provided with a transparent portion to permit the level of the lubricant therein to be viewed, and a venting connection from said extension to the constant-level casing.

8. A viscosity indicating gauge, comprising a measuring casing having an upper inlet for lubricant whose viscosity it is desired to determine and an outlet substantially at the bottom of said casing of smaller cross-sectional area than said inlet, whereby an accumulation of the lubricant in the casing will develop in accordance with the viscosity of the lubricant, level indicating means embodying a further casing and a connection from the measuring casing to said further casing to transfer the liquid level from the former to the latter, and temperature responsive means actuated by the temperature of the lubricant and including an indicator member movable across the lubricant level indicating means.

9. A viscosity indicating gauge, comprising a measuring casing having an inlet for lubricant whose viscosity it is desired to determine, there being an opening at the upper portion thereof and an outlet substantially at the bottom of said casing of smaller cross-sectional area than said inlet whereby an accumulation of the lubricant in the casing will develop in accordance with the viscosity of the lubricant, level indicating means embodying a further casing and a connection from the measuring casing to said further casing to transfer the liquid level from the former to the latter, a by-pass in communication with said upper opening to by-pass said outlet opening of the measuring casing, and temperature responsive means actuated by the temperature of the lubricant and including an indicator member movable across the lubricant level indicating means.

LORIS R. ANDERSON.
HENRY E. PENGILLY.